June 16, 1931.  J. HAYNES  1,810,829
WATERING FOUNTAIN
Filed June 21, 1928   2 Sheets-Sheet 1
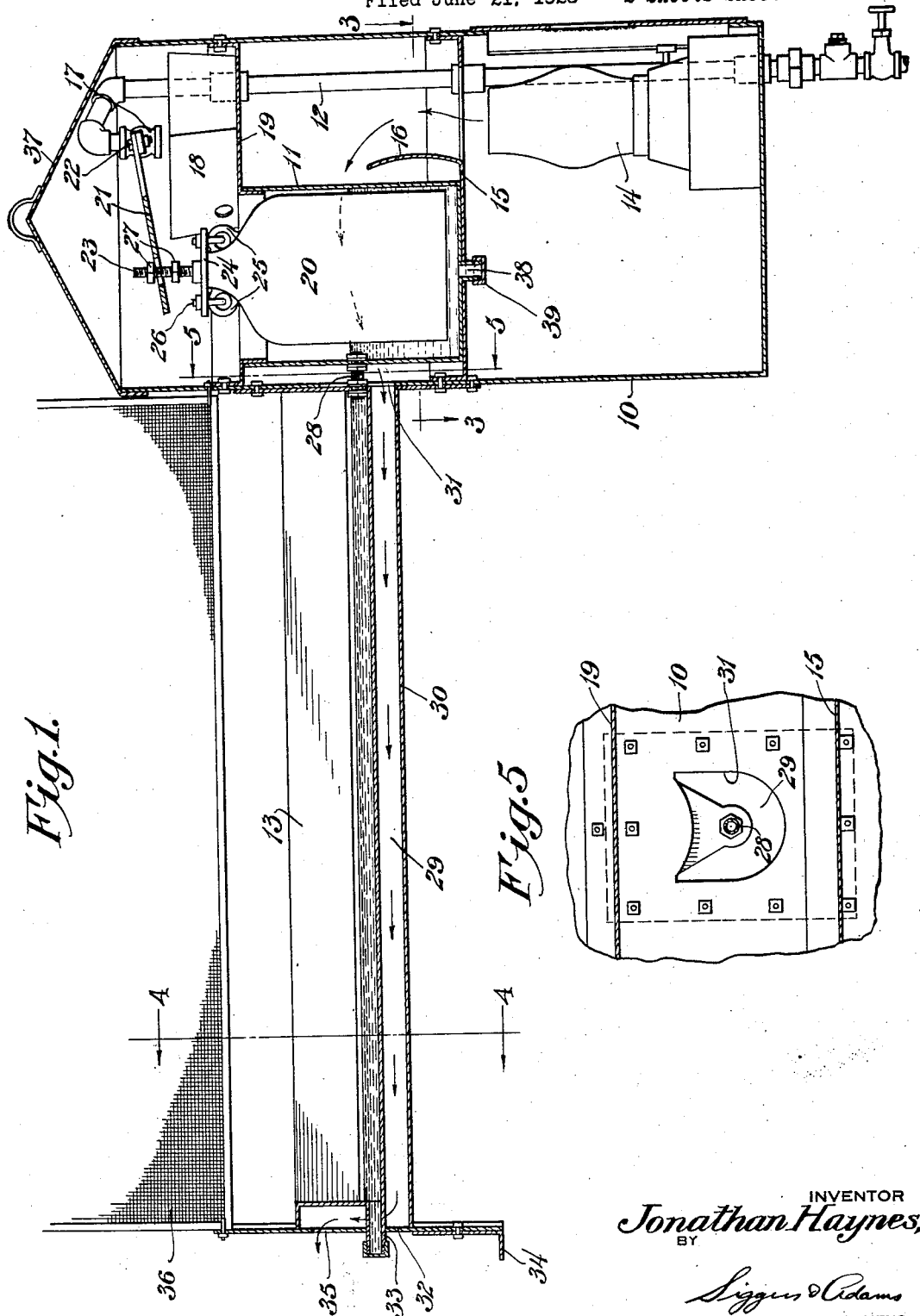
INVENTOR
Jonathan Haynes,
BY
Siggers & Adams
ATTORNEYS

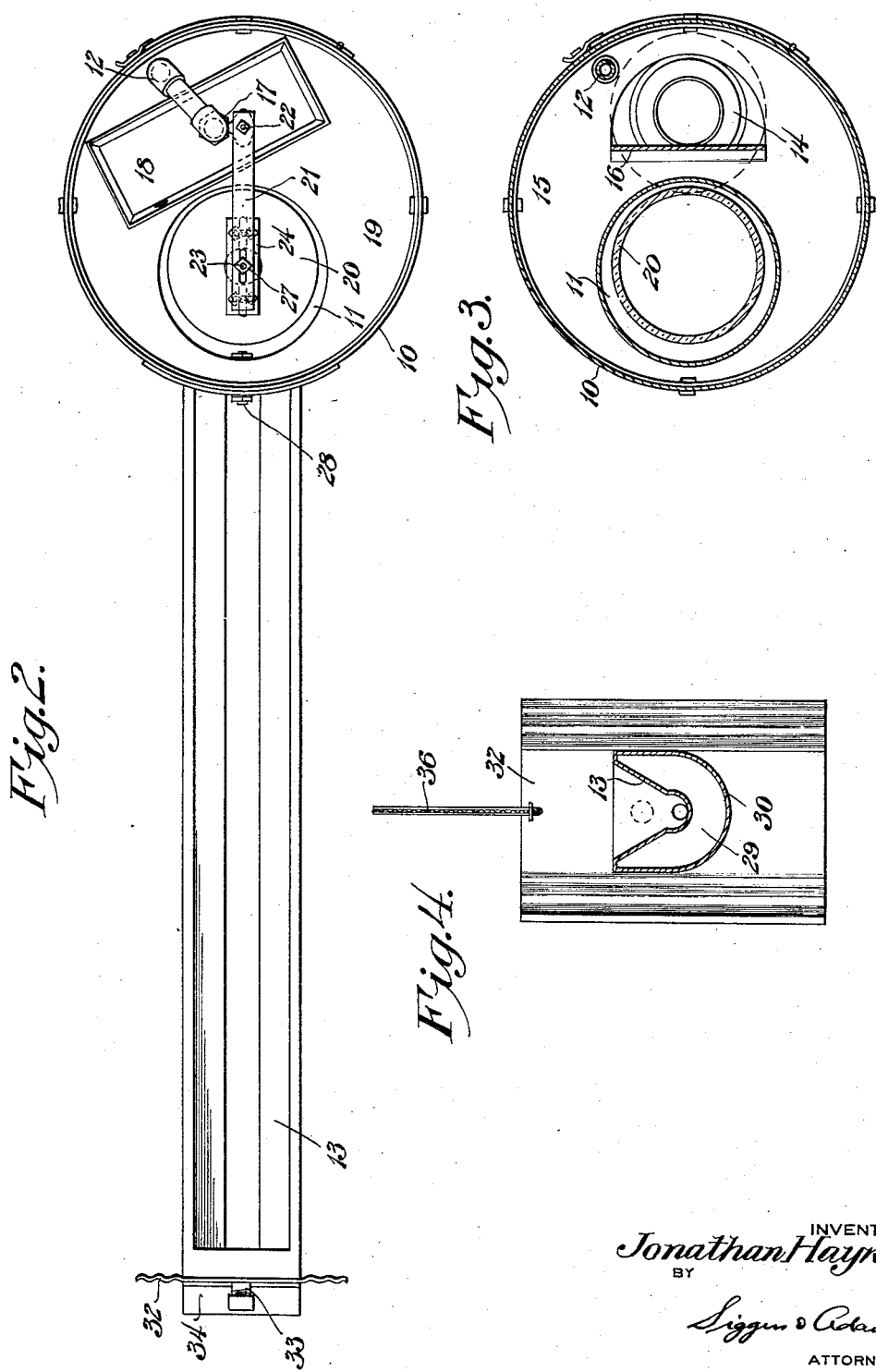

Patented June 16, 1931

1,810,829

UNITED STATES PATENT OFFICE

JONATHAN HAYNES, OF LA CYGNE, KANSAS

WATERING FOUNTAIN

Application filed June 21, 1928. Serial No. 287,132.

This invention relates to watering fountains and aims, among other objects, to provide an improved sanitary drinking fountain for poultry or live stock, adapted to be made very economically and so constructed as to provide a practically continuous supply of fresh drinking water as it is consumed. A further aim is to provide a fountain of this character which is adapted to be employed both winter and summer in the most severe climates.

In the accompanying drawings,

Fig. 1 is a vertical, central sectional view, of one embodiment of the invention;

Fig. 2 is a top plan view of Fig. 1, parts being removed;

Fig. 3 is a sectional view taken on the line 3—3 of Fig. 1;

Fig. 4 is a sectional view taken on the line 4—4 of Fig. 1, and

Fig. 5 is a sectional view taken on the line 5—5 of Fig. 1.

Referring particularly to the drawings, that embodiment of the invention shown therein includes a main casing 10 within which is arranged a chamber 11, which is supplied with water by a water supply pipe 12, leading from a suitable source of supply, the arrangement being such that water is delivered from the chamber to a drinking trough 13. Further, the idea is to expose only a small amount of water to the action of summer heat and of contamination at any given time and to deliver a fresh supply of water to the drinking trough as it is being consumed. Another feature of the invention is the arrangement of a lamp type of heater 14 within the casing 10 adapted to supply sufficient heat indirectly to the chamber and to the trough, the products of combustion being caused to pass through a flue partly surrounding the chamber and the trough.

Referring to Figs. 1, 2 and 3, the casing 10 is shown as being substantially cylindrical and is conveniently made of sheet metal or other suitable material. Within the casing there is provided a partition wall 15 which divides it into a chamber compartment and a heater compartment. Herein, the partition is shown as having a struck-out portion 16 to provide an opening for the gases or products of combustion from the heater 14.

The water supply pipe 12 is shown as extending within the casing substantially to the top thereof and has a valved outlet 17 arranged to discharge or deliver water into a filtering or settling pan 18 suitably supported within the casing by means of a second partition 19. The chamber 11 is supported on the partition 15 and, within the chamber there is shown a large glass float 20 which may be and preferably is in the form of a glass jug or the like, such material not being subject to attack by alkaline or acid substances which may be contained in the water. This float is connected to control the supply of water to the filtering pan 18 from which it discharges into the float chamber.

The means for connecting the glass float shown comprised float lever 21 suitably secured at one end to the stem of the valve 17, conveniently by means of a bolt 22 and, at the other end, the arm is slotted to receive the threaded stem 23 on a securing plate 24 suitably connected to two ears 25 of the jug by means of U-bolts 26. The slotted portion of this float arm or lever works between adjustable nuts 27 which may be set in any position to make the valve function properly and to maintain the water in the chamber at the desired level.

The float chamber 11 is shown in Fig. 1 as being slightly spaced from the left hand side of the casing and is there connected by means of a suitable pipe fitting or nipple 28 to supply or deliver water to the elongated trough 13 which is preferably shaped as shown in Fig. 4, presenting downwardly converging sides and a rounded bottom, the outlet connection being made near the bottom of the trough so that only a small amount of water may be admitted to be exposed to the summer heat or to contamination. The shape of the trough makes it easy to clean and also prevents foreign matter from accumulating on its sides.

Referring now to Figs. 4 and 5, the trough 13 is shown as having a flue 29 for the gases issuing from the heater or lamp 14. Conveniently, this flue is formed by means of a U-shaped sheet metal portion 30 surrounding the bottom portion of the trough proper and the arrangement is such that the gases are forced to travel through the flue beyond the outer end of the trough to the atmosphere. In Fig. 5, there is shown an opening 31 in the wall of the casing 10 so that the gases which pass through that portion of the casing between the partition 19 and the partition 15 will pass out through the flue 29.

To support the outer end of the trough on any suitable base or on the ground, as the case may be, there is shown an end plate 32 suitably connected to the trough. Conveniently, the trough has a drain nipple or extension 33 on which is secured a closure cap and the supporting plate 32 is shown as having an opening through which the nipple projects and, thus, the nipple serves as the support for the trough. Herein, the support 32 is shown as being made of sheet metal of about the same gauge as that of the other principal parts of the fountain and it is corrugated to give it rigidity. Also, it is suitably reinforced and provided with a foot portion by means of an angle piece 34. That portion of the plate which covers the flue has an outlet opening 35 for the gases (Fig. 1).

If the watering fountain is to be used for poultry, it is desirable to provide means to prevent chickens from alighting on the edges of the trough or getting inside the trough and contaminating the water. To this end, there is shown a wire screen 36 having a metal frame secured to the upper end of the supporting plate 32 and to the casing 10 above the top edge of the trough and extending longitudinally of the trough so that it acts as a baffle. The upper end of the screen wire may be secured to the ceiling of a chicken house or to any supporting structure (not shown).

In Fig. 1, the casing 10 is shown as being covered by a removable, cone-shaped cover 37 which is adapted to shield the water in the filtering pan from cold temperatures and to prevent contamination by poultry or live stock. Moreover, the cone shape of the cover will prevent chickens from alighting on it.

If the water in the float chamber 11 should become contaminated, it is desirable to drain it from the bottom. To this end, the chamber is shown as having a nipple extension 38 passing through a hole in the partition 15 and closed by a closure cap 39. Thus, when the cap 39 is removed, the contaminated water may be drained and the whole chamber may be flushed out with fresh water or washed out if the float is removed. Also, the trough may be washed out and then flushed out automatically.

From the foregoing description, it will be seen that this improved watering fountain may be made very cheaply of sheet metal or other suitable material; that it is very efficient and automatic in operation; that it will prevent contamination of the water by poultry or live stock; that the capacity of the float chamber with respect to the float is such that only a small reserve supply of water is kept in it when the water is not being consumed and hence, very little water is exposed to summer heat or to contaminating influences; that the whole installation can be heated very efficiently by a simple lamp or other heater; and that there are practically no operating parts exposed to destruction by poultry or animals. A series of tests have shown that such fountains meet all requirements of the trade and that they will work with practically no attention and very little maintenance cost.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A watering fountain of the character described comprising, in combination, a water supply; a chamber; a float in the chamber of such size as to limit the capacity thereof to a small volume; a valve in the supply pipe automatically controlled by the float; and an elongated watering trough connected at one end to the casing to communicate with the float chamber and having its bottom adjacent to the water level in the float chamber so that only a small amount of water is exposed to contamination and fresh water will be admitted automatically when small quantities are consumed.

2. A watering device of the character described comprising, in combination, a casing; a water supply pipe extending within the casing; a water receiving chamber in the casing; an enlarged float within the chamber to limit the capacity of the chamber so that only a small supply of water is stored therein; a valve in the water supply pipe; a float lever connected to the valve and adjustably connected to the float; and an elongated trough connected at one end to the casing to receive water from said chamber and having its body adjacent to the water level in the float chambers so as to expose only a small amount of water to summer heat or to contaminating influences.

3. A watering device of the character described comprising, in combination, a sheet metal casing; a substantially horizontal partition within the casing; a water receiving chamber supported on the partition within the casing; a water supply pipe having a valve therein arranged to supply water to said chamber; an enlarged glass float within the chamber; a float lever adjustably connected to the float and operatively connected to said valve; an elongated watering trough communicating at one end with the chamber; a heater arranged in the casing below the partition therein; said casing and watering trough having a flue for heated air to circulate and thereby prevent the water from freezing.

4. A watering device of the character described comprising, in combination, a casing, a water receiving chamber within the casing; a valved water supply pipe extending in the upper end of the casing; a removable filtering pan within the casing adapted to receive water from the supply pipe and discharge it into the chamber; a float within the chamber connected to control the admission of fresh water to the filtering pan; and a watering trough connected to the chamber.

5. A watering device of the character described comprising, in combination, a water supply pipe in the upper end of the casing; a filtering pan adapted to receive water from the supply pipe; a float chamber arranged to receive water from the filtering pan; a valve in the supply pipe; a float in said chamber connected to control said valve; and an elongated watering trough communicating at one end with said chamber.

6. A watering device of the character described comprising, in combination, a casing; a partition within said casing providing a heater chamber therein and having an opening for heated gases; a water receiving chamber supported on the partition; a second partition above the water receiving chamber; a filtering pan supported on the second partition and connected to discharge water into said chamber; a source of water supply arranged to discharge into said filtering pan; a float controlled valve in the water supply pipe; and a watering trough secured to the casing at one side and communicating with said chamber, said watering trough having downwardly converging side walls and a round bottom; said casing and said trough having a flue for heated gases from the heater chamber to circulate around the water supplying chamber and the watering trough to prevent the water from freezing.

7. A watering device of the character described comprising, in combination, a casing; a water receiving chamber within the casing; a float controlled valve for supplying water to the chamber; a watering trough connected at one end to the outside of the casing and communicating with the chamber; a supporting plate at the other end of the watering trough; and a screen member arranged substantially vertically above the trough and removably secured to said supporting plate and said casing whereby to prevent fowls from alighting on the sides of the trough and contaminating the water therein.

In testimony, that I claim the foregoing as my own, I have hereto affixed my signature.

JONATHAN HAYNES.